United States Patent [19]

Martin

[11] Patent Number: 4,918,039

[45] Date of Patent: Apr. 17, 1990

[54] BINUCLEAR METATHESIS POLYMERIZATION CATALYST SYSTEM

[75] Inventor: Andrea E. Martin, Avondale, Pa.

[73] Assignee: Hercules Incorporated, Wilmington, Del.

[21] Appl. No.: 247,231

[22] Filed: Sep. 21, 1988

[51] Int. Cl.$^4$ ............................ C08F 4/52; C08F 4/66
[52] U.S. Cl. ................................. 502/113; 502/111; 526/114; 526/116; 526/141; 526/142; 526/143; 526/283
[58] Field of Search ............... 502/172, 104, 111, 113, 502/117, 224, 227; 526/113, 114, 141, 142, 135, 283, 116, 143

[56] References Cited

U.S. PATENT DOCUMENTS

| | | | |
|---|---|---|---|
| 4,080,491 | 3/1978 | Kobayashi et al. | 526/137 |
| 4,176,220 | 11/1979 | Ikeda et al. | 526/114 X |
| 4,481,344 | 11/1984 | Newburg | 526/283 |
| 4,507,453 | 3/1985 | Tom | 526/283 |

OTHER PUBLICATIONS

Makvomol. Chem. 177, 2637 (1976).
Tetrahedron Letters, vol. 21, p. 2955.
Angew. Chem. 85, 148 (1973).
Angew. Chem. 27, 275 (1988).

*Primary Examiner*—Joseph L. Schofer
*Assistant Examiner*—F. M. Teskin
*Attorney, Agent, or Firm*—Mark Goldberg

[57] ABSTRACT

A metathesis polymerization catalyst composition comprising a binuclear catalyst, wherein said binuclear catalyst is a mixture of at least two transition metal components, wherein a first transition metal component is a halide complex of tungsten, an oxyhalide complex of tungsten or a mixture thereof and a second transition metal component is a halide complex of a transition metal selected from the group consisting of high valent transition metals belonging to Groups IV or V of the Periodic Table, from about 1 to about 3 moles of phenolic compound per mole of tungsten component, activated by a metathesis catalyst activator and containing a rate moderator.

9 Claims, No Drawings

BINUCLEAR METATHESIS POLYMERIZATION CATALYST SYSTEM

BACKGROUND OF THE INVENTION

This invention relates to the chemical arts. In particular it relates to a method for the preparation of a cross-linked polymer of dicyclopentadiene (hereinafter referred to as DCPD) with a metathesis-catalyst system. A homogeneous binuclear catalyst which incorporates a known metathesis catalyst, such as $WOCl_4$, and a complex of a different transition metal halide, which by itself may be inactive for metathesis, is used. The incorporation of the second metal complex improves the activity of the catalyst. The binuclear catalyst is activated by traditional metathesis catalyst activators, such as alkyl aluminum compounds.

Preparation of thermoset cycloolefin polymers via metathesis catalysts is a relatively recent development in the polymer art. Klosiewicz, in U.S. Pat. Nos. 4,400,340 and 4,520,181, teaches preparation of such polymers from dicyclopentadiene and other similar cycloolefins via a two-stream reaction injection molding technique wherein a first stream, including the catalyst, and a second stream, including a catalyst activator, are combined in a mix head and immediately injected into a mold where, within a matter of seconds, polymerization and molding to a permanently fixed shape take place simultaneously. These polymers have high impact strength and high modulus.

In the presence of a metathesis catalyst system, polymerization takes place extremely rapidly even at low temperatures. Polymerization occurs so rapidly that it is not unusual for the monomer to polymerize to a solid, immobile condition before the mixed streams can be transferred to the mold. To overcome this difficulty, Klosiewicz teaches the inclusion of a reaction rate moderator in the activator stream to delay the catalyst activation until the reaction mass is totally within the mold. The total time from mixing until polymerization is substantially complete is still just a matter of seconds.

In the typical system, according to Klosiewicz, the catalyst component is a tungsten or molybdenum halide and the activator is an alkyl aluminum compound. The reaction rate moderator can be an ester, ether, ketone or nitrile.

A reaction injection molding process involves the mixing of two or more low viscosity reactive streams. The combined streams are then injected into a mold where they quickly set up into a solid infusible mass. For a RIM system to be of use with a particular polymer, certain requirements must be met: (1) the individual streams must be stable and must have a reasonable shelf-life under ambient conditions; (2) it must be possible to mix the streams thoroughly without their setting up in the mixing head; (3) when injected into the mold, the materials must set up to a solid system rapidly; and (4) any additives-fillers, stabilizers, pigments, etc. must be added before the material sets up. Therefore, the additives selected must not interfere with the polymerization reaction. The catalyst should also have sufficient activity that the polymerization is essentially complete, that is, so that the residual monomer is minimized. The presence of residual monomer may have a deleterious effect on properties, such as stiffness, and may impart an objectionable odor to the part.

It is the object of this invention to provide cycloolefin polymerization catalyst systems having substantially increased activity compared to catalyst systems previously employed. It is further an object of this invention to promote more complete polymerization of the dicyclopentadiene monomer.

Homogeneous olefin metathesis polymerization catalysts are commonly based on $WCl_6$, activated with alkylating agents such as alkyl aluminum or alkyl tin compounds. Studies have shown that it is actually $WOCl_4$, which forms by contact with moisture, which is the major contributor to activity of catalysts based on $WCl_6$. Pure $WOCl_4$ is also an effective metathesis catalyst. Recently, Martin in U.S. Pat. No. 4,696,985 disclosed that a mixture of $WCl_6$ and $WOCl_4$ activated with an aluminum alkyl or an aluminum alkyl halide, had greater activity for metathesis of strained cyclic olefins than either component alone. The controlled addition of an oxygen donor to $WCl_6$ to form a mixture of $WCl_6$ and $WOCl_4$ improved catalyst activity.

In U.S. Pat. No. 4,703,068 a tantalum pentachloride catalyst was disclosed as being employed in a method of making a cross-linked substantially transparent low haze polymer. Other transition metal complexes can also act as homogenous metathesis catalysts, although their activity tends to be lower than those based on tungsten or molybdenum. There are only a few examples of two different transition metal complexes being used together as metathesis catalysts. In most cases, these are heterogeneous catalysts, which are not soluble in the monomer. Heterogeneous catalysts tend to be unsuitable for bulk polymerization because the catalyst becomes encapsulated in the polymerizing mixture and is not mobile, leading to incomplete polymerization. In other cases, the second transition metal complex serves as the activator component of a homogeneous metathesis catalyst, rather than as a component of the catalyst itself, which requires a third component as an activator.

Preparation of a thermoset polyDCPD by reactive liquid processing has been disclosed by Klosiewicz in U.S. Pat. No. 4,400,340. Typically, dicyclopentadiene monomer is used to prepare two or more reactive liquid streams. One stream contains the monomer and the metathesis catalyst activator ("A Component"), which is typically an aluminum alkyl or aluminum alkyl halide, or other metathesis activator. The A Component also typically contains the rate moderator. The second stream ("B Component") contains the monomer, other desired additives, and a homogeneous metathesis catalyst, or, more properly a catalyst precursor. This precursor is solubilized and stabilized to prevent any premature polymerization. Thus, two stable streams are obtained which can be processed in typical reactive liquid processing methods, such as RIM. Other materials, such as an elastomer, may be incorporated into either stream or into both streams. The elastomer imparts viscosity, which improves the processability and may also alter the polymer mechanical properties.

The catalyst solution typically used in this process is a homogeneous catalyst based on $WCl_6$. The solution is prepared by dissolving $WCl_6$ in an inert solvent, usually an aromatic solvent such as toluene or chlorobenzene. Activity is improved by controlled addition of an oxygen donor to produce a mixture of $WCl_6$ and $WOCl_4$. Next, the catalyst is solubilized by addition of a phenolic compound, such as an alkyl phenol. This intermediate solution has excellent metathesis catalyst activity. However, it is not optimum in a RIM process because it does not provide a stable solution in monomer, i.e. it has a short shelf life because it causes a slow polymerization of the DCPD. Thus, a stabilizing agent, typically a Lewis base, and preferably a chelating agent, is added. Most commonly, this is a material such as acetylacetone (2,4-pentanedione, abbreviated as acac). Finally, this catalyst solution is added to the monomer stream to form the B Component. When the two streams are mixed, exothermic polymerization takes place within a short time, frequently less than one minute. Thus, useful articles can be fabricated directly from the monomer, reducing the cost of polymer processing.

It has been found desirable to find means to retain and to increase the activity of the catalyst when using the moderators and stabilizing agents. This invention discloses a means of increasing the activity of the catalyst by introducing a second component which is a complex of a transition metal other than the tungsten of the catalyst used in the prior art.

BRIEF DESCRIPTION OF THE INVENTION

The invention relates to a catalyst composition for polymerization of strained ring cycloolefin monomers. These catalyst compositions are homogeneous binuclear catalysts which include complexes of two different transition metals. Catalysts containing two different transition metals are well-known in heterogeneous catalysis and are commonly referred to as binuclear or bimetallic catalysts. As used in this art, a homogeneous binuclear catalyst is one which is comprised of a mixture of soluble compounds of different transition metals. Specifically, the mixture includes a known metathesis catalyst, such as $WOCl_4$, and a halide complex of a different transition metal, which by itself may be inactive for metathesis. The mixture is activated by typical metathesis catalyst activators.

DETAILED DESCRIPTION OF THE INVENTION

As used herein, unless otherwise specified, percentage of materials are in percent by weight.

As used herein, unless otherwise specified, "solvent" means a fluid in which the monomer or catalyst is readily soluble.

Strained ring cycloolefins, for example, dicyclopentadiene can be polymerized in such a manner that the resulting product is a thermoset homopolymer having high impact strength and high modulus. Dicyclopentadiene, the preferred monomer, is commercially available endo-DCPD (3a,4,7,7a tetrahydro-4,7-methano-1H-indene). The exo-isomer, while not commercially available, can also be used. The preferred commercially available material should be purified in order to remove impurities which inhibit the polymerization. The low boiling fraction should be removed. This can be done by stripping away several percent of the unsaturated four to six carbon atom volatiles, i.e., the volatiles distilled below 100° C. at about 90±3 torr absolute pressure. It is often desirable to purify the starting material even further by treatment with an absorbent such as molecular sieves, alumina or silica gel. Additionally, the water content of the starting material should be below about 100 ppm. The presence of water interferes with polymerization by hydrolysis of both the catalyst and the activator components of the catalyst system. Water can be removed by azeotropic distillation under reduced pressure.

The polymerization of the purified cycloolefin containing at least 50 percent dicyclopentadiene is catalyzed by a two part metathesis-catalyst system. One part contains a catalyst including a tungsten compound, such as a tungsten halide or tungsten oxyhalide, for example $WCl_6$, $WOCl_4$, or a mixture thereof. Preferably for the purposes of this invention the tungsten compound is substantially pure $WOCl_4$. For improved activity, this first part also contains a transition metal halide complex other than tungsten. Preferred transition metal halide complexes are high oxidation state complexes of high valent transition metals belonging to Groups IVB and VB of the Periodic Table. The most preferred transition metal halides are complexes of titanium, tantalum and niobium including titanium tetrachloride, tantalum pentachloride, and niobium pentachloride. This complex may be one which does not by itself catalyze metathesis polymerization under the conditions described in this application. This binuclear catalyst is activated by mixing with an activator, which forms the second part of the metathesis catalyst system. Typically, the activator has been an alkylaluminum compound. Other metathesis catalyst activators, such as alkyl tin reagents may also be used. These latter activators, being poorer Lewis acids, should be most effective with catalysts in which the Lewis base stabilizer (such as acetylacetone) has been omitted. The alkylaluminum compound can be a trialkylaluminum, an alkylaluminum dihalide or a dialkylaluminum halide where the alkyl group contains one to ten carbon atoms. In the preferred activator the alkyl group is octyl.

The tungsten compound, or mixture of compounds, can be solubilized by the addition of a small amount of an alcoholic or a phenolic compound. Phenolic compounds are preferred. Suitable phenolic compounds include phenol, alkyl phenols, halogenated phenols and phenolate salts, with t-butyl phenol, octyl phenol and nonyl phenol being most preferred. The preferred molar ratio of tungsten compound to phenolic compound is from about 1:1 to about 1:3. The tungsten compound/phenolic compound solution can be made by adding the phenolic compound to a tungsten compound/organic solvent slurry, stirring the solution, and blowing a stream of a dry inert gas, such as nitrogen, through the solution to remove any hydrogen chloride. The organic solvent may be an aromatic solvent such as toluene, benzene, or chlorobenzene, dichlorobenzene, or trichlorobenzene; or a chlorinated hydrocarbon such as methylene chloride. Alternatively, a phenolic salt, such as a lithium or sodium phenoxide, can be added to a tungsten compound/organic solvent slurry, the mixture stirred until essentially all the tungsten compound is dissolved, and the precipitated inorganic salt removed by filtration or centrifugation. All of these steps should be carried out in the absence of moisture and air to prevent deactivation of the catalyst.

To prevent premature polymerization of the tungsten compound/monomer solution, which would occur within a matter of hours in the presence of neat $WOCl_4$, from about 1 to about 5 moles of a Lewis base or chelating agent can be added per mole of tungsten compound. Preferred chelants include acetylacetones and alkyl acetoacetates, where the alkyl group contains from one to ten carbon atoms; preferred Lewis bases are nitriles and ethers, such as benzonitrile and tetrahydrofuran. The improvement in the stability and shelf-life of the tungsten compound/monomer solution is obtained whether the complexing agent is added before or after the phenolic compound. When purified cycloolefin, such as dicyclopentadiene, is added to this catalyst solution it forms a solution which is stable and has a shelf-life of several months.

From about 0.5 to about 2.5 moles of a transition metal halide complex is added per mole of tungsten compound to improve the activity of the catalyst. This produces a mole ratio of transition metal halide complex to tungsten compound of from about 1:2 to about 2.5:1. Preferred transition metal halides are high oxidation state complexes of Groups IVB and VB of the Periodic Table. It is desirable that these compounds do not by themselves have activity for catalyzing metathesis polymerization, so that premature polymerization of the catalyst/monomer solution does not occur.

Best results are obtained if the second transition metal component of the binuclear catalyst is added after the tungsten catalyst solution has been prepared. If the transition metal halide is added prior to addition of acetylacetone, for example, activity is adversely affected. The transition metal complex may be added neat, as in the case of $TiCl_4$, which is a liquid. It may also be added as a solution in a solvent, preferably an aromatic solvent such as benzene, toluene, chlorobenzene, or xylene. It is desirable to use a solvent which does not react with the transition metal complex and which minimizes the quantity of solvent used. If solubility is poor, the transition metal complex may be solubilized in the same fashion as the tungsten component, such as by the addition of a phenol, an alkyl phenol, or a halogenated phenol. The transition metal solution may be added either to the tungsten solution before mixing with monomer, or to the monomer/tungsten catalyst solution after it has been prepared. Other modifications may be made by those exercising ordinary skill in the art.

EXAMPLE 1

Preparation of the Tungsten Catalyst Solution

In Example 1, a 0.05M solution of a tungsten containing catalyst solution is prepared by first preparing pure $WOCl_4$, according to the procedure disclosed by Pedersen et al., J. Am. Chem. Soc., 1982, 104, 7483-7491, by reaction of $WCl_6$ and $Me_3SiOMe$ in $CH_2Cl_2$. Finely ground $WCl_6$ (54.5 g, 0.14M) is suspended in dichloromethane (350 ml) and the mixture stirred vigorously while a dichloromethane solution (40 ml) of $Me_3SiOMe$ (14.3 g, 0.14M) is added dropwise over a 4 hour period. The mixture is filtered, and the orange precipitate washed with pentane and dried in vacuo. The dichloromethane is removed from the filtrate in vacuo, leaving a red-orange solid. This material along with the above orange precipitate is sublimed at 80° C. under vacuum to give 42.7 g (91%) of pure, crystalline $WOCl_4$. Under an inert atmosphere, such as a $N_2$ atmosphere, 0.6158 grams (0.00180 mole) $WOCl_4$ is weighed into a vessel. Next, 36.0 ml dry toluene is added to give a reddish slurry. To the slurry is added 1.80 ml of a 1.0M solution of nonylphenol (0.00180 mole) in toluene. The solution is stirred and sparged with nitrogen for 1 hour to remove the byproduct HCl. Finally, 0.18 ml acetylacetone (acac) (0.00180 mole) is added, and the solution is again sparged for 1 hour. In this and all the following examples, phenol is used as a shorthand for nonylphenol and for simplicity the solution is referred to as W/phenol/acac.

EXAMPLE 2

Polymerizations with Tungsten Catalyst Solution and $TiCl_4$

In Example 2, a monomer solution containing the binuclear catalyst is prepared. A 15×125 mm test tube, capped with an unextracted rubber stopper, is sparged with nitrogen for 10 minutes. Five ml of dicyclopentadiene (DCPD) is placed in the test tube which is sparged for an additional 10 minutes. To this test tube is added 0.38 ml of the catalyst solution of Example 1 and 0.57 ml of a 0.1M solution of $TiCl_4$ in toluene. Polymerization is initiated at 26°-28° C. by injecting 0.16 ml of a 0.35M solution of tri-n-octylaluminum (TNOA) and bis(methoxyethyl) ether (diglyme, a reaction rate moderator) in toluene. The time to exothermic cure (induction time) and the exotherm are recorded with a thermocouple. Typical results are shown below in Table 1, along with comparative examples omitting first the $WOCl_4$ and then the $TiCl_4$. In the absence of the tungsten compound, no exothermic cure is obtained, demonstrating the inability of $TiCl_4$ to polymerize DCPD without the other component of the binuclear catalyst. In the absence of the titanium compound, the tungsten compound can polymerize DCPD, but the activity is poorer as shown by the induction times.

TABLE 1

| DCPD/W/Ti/Al Mole Ratio | Exotherm (°C.) | Induction Time (seconds) |
|---|---|---|
| 2000/1/3/3 | 157 | 25 |
| 2000/0/3/3 | none | no cure |
| 2000/1/0/3 | 165 | 85 |

EXAMPLES 3 AND 4

Polymerizations with $TiCl_4$/$WOCl_4$ Binuclear Catalyst Using Different Aluminum Alkyl Activators In Examples 3 and 4 the procedure of Example 2 is followed, except that the TNOA/Diglyme solution is replaced with a mixture of TNOA and DOAI (di-n-octylaluminum iodide), moderated with diglyme, or DEAC (diethylaluminum chloride), moderated with di-n-butyl ether. Results are given in Table 2. As shown, increasing the level of $TiCl_4$ improves the induction time, with either an improvement or essentially no effect on the residual monomer level.

TABLE 3

| DCPD/W/Ta/Al Mole Ratio | Exotherm (°C.) | Induction Time (seconds) | Residual Monomer (%) |
|---|---|---|---|
| 2000/1/1.4/1.7 | 160 | 90 | 0.4 |
| 2000/1/2.1/1.7 | 150 | 54 | 0.1 |
| 2000/1/2.1/2.4 | 145 | 52 | 0.1 |

EXAMPLE 5

Polymerizations with $TaCl_5$/$WOCl_4$ Binuclear Catalyst Activated With TNOA In Example 5, the procedure of Example 2 is followed, using a 0.05M solution of $TaCl_5$ reacted with 1.0 equivalent of nonylphenol in toluene in place of the $TiCl_4$ solution. Results are shown below in Table 3. Without the tungsten compound, the tantalum compound is inactive for metathesis polymerization. However, activity of $WOCl_4$ is greatly improved by addition of $TaCl_5$.

TABLE 2

| DCPD/W/Ti/Al Mole Ratio | Al Type | Exotherm (°C.) | Induction Time (sec) | Residual Monomer (%) |
| --- | --- | --- | --- | --- |
| Example 3 | | | | |
| 2000/1/1/3 | TNOA/DOAI | 164 | 50 | 0.4 |
| 2000/1/.5/3 | TNOA/DOAI | 168 | 75 | 0.2 |
| Example 4 | | | | |
| 2000/1/1/1.5 | DEAC | 170 | 44 | 0.9 |
| 2000/1/0/1.5 | DEAC | 145 | 92 | 1.7 |

EXAMPLE 6

Polymerizations with $NbCl_5/WOCl_4$ Binuclear Catalyst Activated with TNOA

In Example 6, the procedure of Example 2 is followed, using a 0.1M solution of $NbCl_5$ reacted with 1.0 equivalent of nonylphenol in toluene in place of the $TiCl_4$ solution. Results are shown in Table 4. Without the tungsten compound, the niobium compound is inactive for metathesis polymerization. Activity of the tungsten catalyst is greatly improved by addition of the niobium compound.

TABLE 4

| DCPD/W/Nb/Al Mole Ratio | Exotherm (°C.) | Induction Time (seconds) |
| --- | --- | --- |
| 2000/1/3/3 | 145 | 30 |
| 2000/0/3/3 | none | no cure |
| 2000/1/0/3 | 154 | 90 |

EXAMPLE 7

Polymerizations With $MoCl_5/WOCl_4$ Binuclear Catalyst Activated With TNOA

In Example 7, the procedure of Example 2 is followed, except that the $TiCl_4$ solution is replaced with a 0.1M solution of $MoCl_5$ reacted with one equivalent of nonylphenol in toluene. By itself, $MoCl_5$ causes the DCPD to gel which is unsatisfactory. The results shown in Table 5 demonstrate that $MoCl_5$ is not a suitable component of the binuclear catalyst.

TABLE 5

| DCPD/W/Mo/Al Mole Ratio | Exotherm (°C.) | Induction Time (seconds) |
| --- | --- | --- |
| 2000/1/3/3 | 126 | 180 |
| 2000/0/3/3 | gel | 110 |

EXAMPLE 8

Preparation of PolyDCPD in a RIM Process Using A $TiCl_4/WOCl_4$ Binuclear Catalyst In Example 8, polymerized dicyclopentadiene is made by RIM processing using a standard RIM machine manufactured by Accuratio Co. of Jeffersonville, Ind. The following description illustrates the procedure for molding. First the desired amount of catalyst-DCPD mixture and activator-dicyclopentadiene mixture is charged respectively to two 2 gallon tanks. The tanks are located on different sides of the RIM machine: the tank on the A side is the one to which the activator mixture is added and the tank on the B side is the one to which the catalyst solution is added. If desired, rubber and/or organic resins are added as a predissolved solution in dicyclopentadiene. Also solid fillers are added if desired. The tanks are then closed off and placed under a nitrogen atmosphere.

The first stream ("A component") is prepared from 3.52 liters (7.5 pounds) of DCPD containing 6% by weight of a random styrene-butadiene rubber and 128 ml of a 1.0M activator concentrate (TNOA/DOAI/DG, 85/15/100 mole ratio) in DCPD. This provides a DCPD/Al mole ratio of about 550/3. The second stream ("B Component") is prepared from 3.52 liters of rubberized DCPD and 900 ml of a binuclear catalyst solution. The catalyst solution, 0.05M in toluene, contains $WOCl_4/C_9PhOH/acac$, 1/1/1, to which 1 equivalent of $TiCl_4$ had been added. This provides a DCPD/W/Ti mole ratio of about 550/1/1. Also added to the B Component is 69 grams of Irganox 1076, (an antioxidant) and 15 ml of rose oxide (a deodorant).

The mixing of the activator solution (A Component) and the catalyst solution (B Component) is accomplished using a standard impingement type RIM mixhead. The ratio of the activator/monomer solution mixed with catalyst/monomer solution is 1:1. The impingement mixing is accomplished by passing both the solutions through orifices 0.032" in diameter at a flow rate of approximately 80 ml/sec. This requires pumping pressure of approximately 1000 psi. The resulting mixture flows directly into a mold heated between 50° C. and 60° C. The mold is made out of aluminum and is chrome plated. The mold has a flat cavity which forms a plaque sample 10"×10"×⅛" thick. A clamping force of 1.5 tons is used to keep the mold closed. A cross-linked polymer is formed. The finished samples cure in about 8 seconds and are demolded in about 20 seconds.

Physical properties of these samples, in comparison with polydicyclopentadiene prepared according to the method of Klosiewicz are given in Table 6. The properties of the polymer according to the method of Example 5, in the column on the right, are somewhat lower than those of the comparative example. This is due to the large volume of solvent remaining in the parts. However, the residual monomer level is reduced by about one-half.

TABLE 6

| Property | PolyDCPD Klosiewicz | PolyDCPD Example 5 |
| --- | --- | --- |
| Flexural Modulus (kpsi) | 270 | 231 |
| Flexural Strength (kpsi) | 10 | 7 |
| Tensile Modulus (kpsi) | 200 | 178 |
| Tensile Strength (kpsi) | 5 | 4 |
| Tensile Elongation (%) | 60 | 70 |
| Plate Impact (ft-lb) | 11 | 11 |
| Residual Monomer (%) | about 3 | 1.4 |
| Residual Toluene (%) | less than 1 | 6.9 |

Other features, advantages and specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What I claim is:

1. In a two-part metathesis polymerization catalyst system wherein part one of said system comprises $WOCl_4$ or a combination of $WOCl_4$ and $WCl_6$, a halide complex of a transition metal, said $WOCl_4$ or combination of $WOCl_4$ and $WCl_6$ first being dissolved in a solvent, solubilized with a phenolic compound and stabilized by a chelating agent or a Lewis base before being added to said halide complex of a transition metal; and wherein part two of said system comprises a catalyst activator, the improvement wherein a halide complex of a transition metal is added to part one of said system in a mole ratio of halide complex of transition metal to tungsten compound of from about 1:2 to about 2.5:1, wherein said transition metal is selected from the group consisting of Group IVB and Group VB of the Periodic Table.

2. The metathesis polymerization catalyst system of claim 1 wherein said halide complex of a transition metal is selected from the group consisting of tantalum pentachloride, niobium pentachloride and titanium tetrachloride.

3. The metathesis polymerization catalyst system of claim 2 wherein said phenolic compound is selected from the group consisting of phenol, alkyl phenols, halogenated phenols and phenolate salts and said chelating compound is selected from the group consisting of acetylacetones and alkyl acetoacetates, where the alkyl has one to ten carbon atoms and is present in an amount such that the mole ratio of catalyst to chelating agent is from about 1:1 to about 1:3.

4. The metathesis polymerization system of claim 3 wherein said phenolic compound is selected from the group consisting of t-butyl phenol, octyl phenol and nonyl phenol.

5. The metathesis polymerization system of claim 4 wherein said chelating compound is acetylacetone.

6. The metathesis polymerization catalyst system of claim 5 wherein said Lewis base is selected from the group consisting of nitriles and ethers.

7. The system of claim 6 wherein said Lewis base is benzonitrile or tetrahydrofuran.

8. The system of claim 7 wherein said activator is an alkyl aluminum compound.

9. The system of claim 8 wherein said alkylaluminum compound is selected from the group consisting of trialkylaluminum, alkylaluminum dihalide and dialkylaluminum halide, or a mixture thereof, wherein said alkyl group contains one to ten carbon atoms.

* * * * *